(12) United States Patent
Shih (10) Patent No.: US 6,265,969 B1
(45) Date of Patent: Jul. 24, 2001

(54) TELESCOPING WARNING DEVICE FOR MOTOR VEHICLE

(76) Inventor: Hung-Ming Shih, 5F, No. 487, Da Yu Road, Tao Yuan City (TW)

(*) Notice: Subject to any disclaimer, the term of this patent is extended or adjusted under 35 U.S.C. 154(b) by 0 days.

(21) Appl. No.: 09/493,203

(22) Filed: Jan. 28, 2000

(51) Int. Cl.⁷ ....................................................... B60Q 1/26
(52) U.S. Cl. ........................ 340/468; 340/488; 340/489; 340/907
(58) Field of Search .................... 340/468, 473, 340/484, 487, 489, 488, 908, 908.1, 471, 907

(56) References Cited

U.S. PATENT DOCUMENTS

| | | | |
|---|---|---|---|
| 5,155,667 | * | 10/1992 | Ho ........................................ 362/190 |
| 5,319,365 | * | 6/1994 | Hillinger ........................... 340/908.1 |
| 5,445,352 | * | 8/1995 | Long ................................... 248/354.5 |

* cited by examiner

Primary Examiner—Jeffery Hofsass
Assistant Examiner—Daniel Previl
(74) Attorney, Agent, or Firm—Bacon & Thomas (57) ABSTRACT

A warning device for motor vehicle comprises a telescoping stand, a body, and a flexible main lamp. Body is a cylindrical with main lamp mounted on top, button set and buzzer on the upper portion, strip or LED lamps on the side, and battery compartment and cap on the lower portion. Stand has three legs and a slidable sleeve wherein each leg has a top catch member hinged to a pivot of sleeve; a link is pivotably secured between a lower catch member at center of leg and a catch member of body; and sleeve has at least one projection being secured to corresponding recesses on the surface of body such that a tripod is formed by the extended three legs when cover on the bottom of body is detached. Luminescent stripes are adhered to each leg. Three sturdy boards are provided each detachably mounted between two adjacent legs for increasing stability.

3 Claims, 9 Drawing Sheets

TELESCOPING WARNING DEVICE FOR MOTOR VEHICLE

FIELD OF THE INVENTION

The present invention relates to warning device and more particularly to a multi-functional warning device for motor vehicle.

BACKGROUND OF THE INVENTION

Every driver should carry at least one warning device on his/her automobile in compliance with the traffic regulations. Conventionally, a triangular member with luminescent stripes adhered thereon is employed as warning device. It is advantageous for being compact in stowage on car such that driver may conveniently use it when breakdown occurs. But this triangular shaped warning device is unsatisfactory for the purpose for which the invention is concerned for the following reasons: 1) the reflection is poor which is even worse in a dark environment; 2) driver may neglect it when speeding due to its compact size which in turn may cause a danger; 3) it is a single purpose device; and 4) it is not stable when installed on ground.

Thus, it is desirable to provide an improved multi-functional warning device for motor vehicle in order to overcome the above drawbacks of prior art.

SUMMARY OF THE INVENTION

It is an object of the present invention to provide a multi-functional warning device for motor vehicle capable of emitting light and making a sound. The present invention has the advantages of employed as: an auxiliary lighting for repairing car; a flashlight; an auxiliary lighting for driver to carry to a poor lighting area; and making a buzzing sound as a signal for alerting passing vehicles as well as a help. The present invention has the additional advantages of: convenient in use due to its cylindrical shape; employed as a light-emitting and flashing club for flagman to regulate traffic; installed as a tripod on ground for alerting; stable when installed; a portion thereof being detachable to form an upright triangular member installed in a the back of the motor vehicle for alerting vehicles coming from back; compact; and easy collapsing and extending.

To achieve the above and other objects, the present invention provides a warning device for motor vehicle comprising a telescoping stand, a body, a main lamp, a buzzer, and a circuitry wherein body is a cylindrical shaped member with elongate flexible main lamp mounted on top, button set and buzzer on the upper portion, a plurality of strip or LED lamps on the side, and battery compartment and battery cover on the lower portion; telescoping stand is comprised of three legs and a slidable sleeve, each leg has a top catch member hinged to a pivot of sleeve; a link is pivotably secured between a lower catch member at center of leg and a catch member of body; and sleeve has at least one small projection being secured to at least one mating recess on the surface of body such that a tripod is formed by the extended three legs when cover on the bottom of body is detached. A plurality of luminescent stripes are adhered to the upper and lower portions of the inside of each leg. Three elongate boards are provided each detachably mounted between the lower portions of two legs. Boards are relatively heavy for increasing the stability of the device. A pair of opposing hinged plates are provided on one of the boards served as an additional support when boards are formed as an upright triangular member. Also, an outlet is provided opposed to the button set for allowing to charge the batteries from external power source.

The above and other objects, features and advantages of the present invention will become apparent from the following detailed description taken with the accompanying drawings.

DETAILED DESCRIPTION OF THE PREFERRED EMBODIMENTS

Referring to FIGS. 1–9, there is shown a warning device 10 constructed in accordance with the invention comprising a telescoping stand 1, a body 2, a main lamp 3, a buzzer 4, and a circuitry 5. Body 2 is a cylindrical shaped member with elongate flexible main lamp (also known as snake lamp) 3 mounted on top, button set 6 and buzzer 4 on the upper portion, a number of strip or LED lamps 7 on the side, and battery compartment 8 and battery cap 81 on the lower portion. Telescoping stand 1 is comprised of three legs 11 each with arcuate section and a sleeve 12 wherein sleeve 12 is slidable to a position below the top of main lamp 3. Sleeve 12 is made of a transparent material. A plurality of of holes are provided on the surface of sleeve 12 for permitting button set 6 to protrude therefrom. Each leg 11 has a top catch member with a pin 111 hinged to a pivot 121 of sleeve 12 at a circumferential surface near the bottom thereof, i.e., below button set 6. Link 13 is pivotably secured between a lower catch member 112 at center of leg 11 and a catch member 21 of body 2. Sleeve 12 has at least one small projection 122 being secured to at least one mating recess 22 on the surface of body 2. A small projection 123 on the inner surface of sleeve 12 is received in the mating recess 23 of body 2 for securing therein. Legs 11 are extended outwardly by the downward movement of slidable sleeve 12 when cover 14 on the bottom of body 2 is detached. Then above small projections and mating recesses are engaged and secured. As a result, a tripod is formed by the legs 11. A plurality of luminescent stripes 113 are adhered to the upper and lower portions of the inside of leg 11. Three elongate boards 15 are provided each having a protrusion 151 on either side capable of snapping into an aperture 114 on the circumferential surface near the bottom of leg 11. Boards 15 are made of relatively heavy metal material for increasing the stability of the device 10 or, alternatively, a plurality of metal bars (not shown) are employed to fasten the tripod. Also, a plurality of luminescent stripes 153 are adhered to the upper and lower portions of the outer surface of each board 15. A pair of opposing hinged plates 154 are provided on one of boards 15. Plates 154 and the board 15 are shaped like a U when plates 154 are extended. A hole 152 is provided on one end and a protrusion 156 is provided on the opposing end of board 15. Such that protrusion 156 of each board 15 is inserted into hole 152 of an adjacent board 15 so as to form a triangle wherein the above U serves as an additional support of the triangular member when it is upright. Also, a charging outlet 9 is provided opposed to the button set 6 on the body 2 for allowing to charge the batteries from external power source through hole 124 of sleeve 12. Charging outlet 9 is adapted to receive a plug electrically connected to either a household power source or a cigar lighter of the car.

Figure 1:
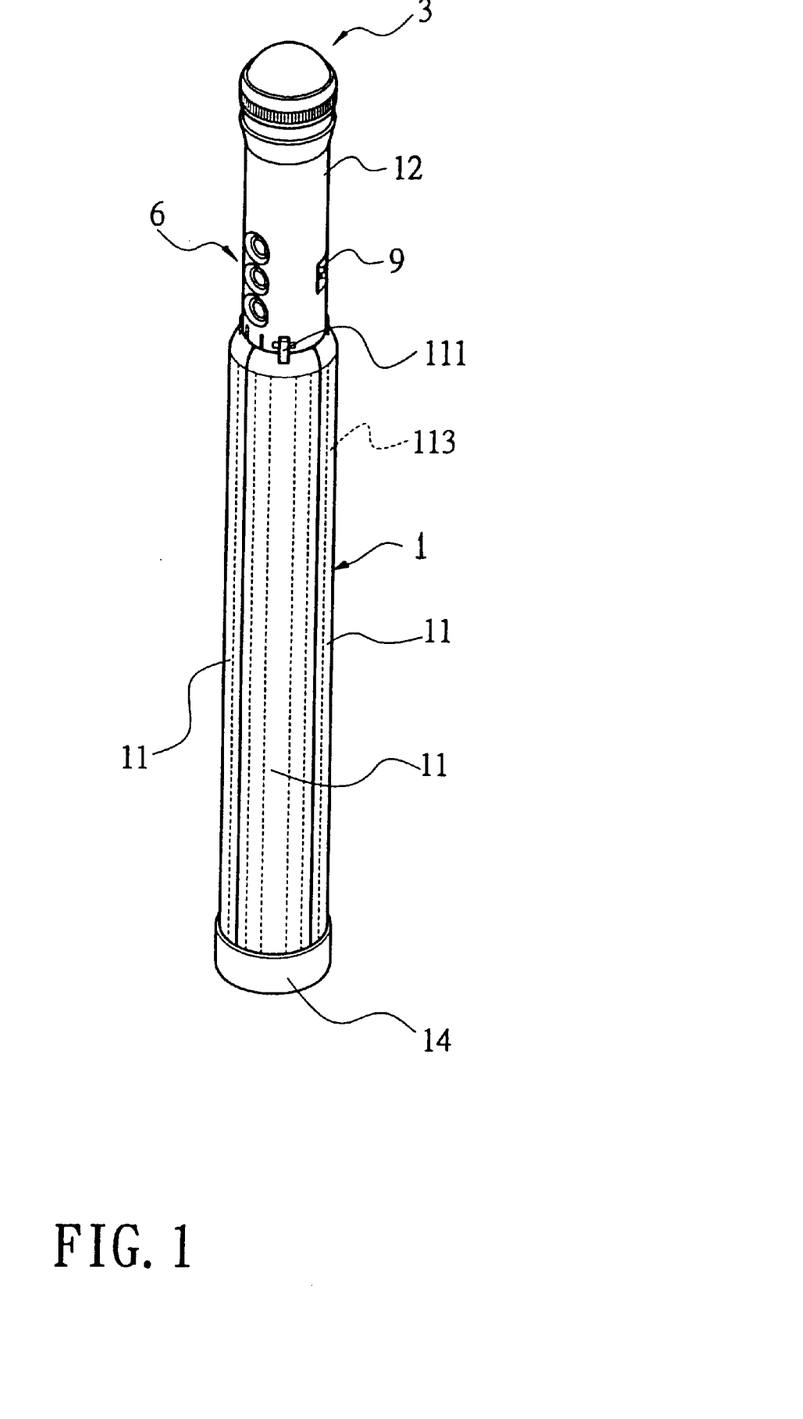
FIG. 1 is a perspective view of warning device of the invention, where warning device is collapsed as a club.
Figure 2:
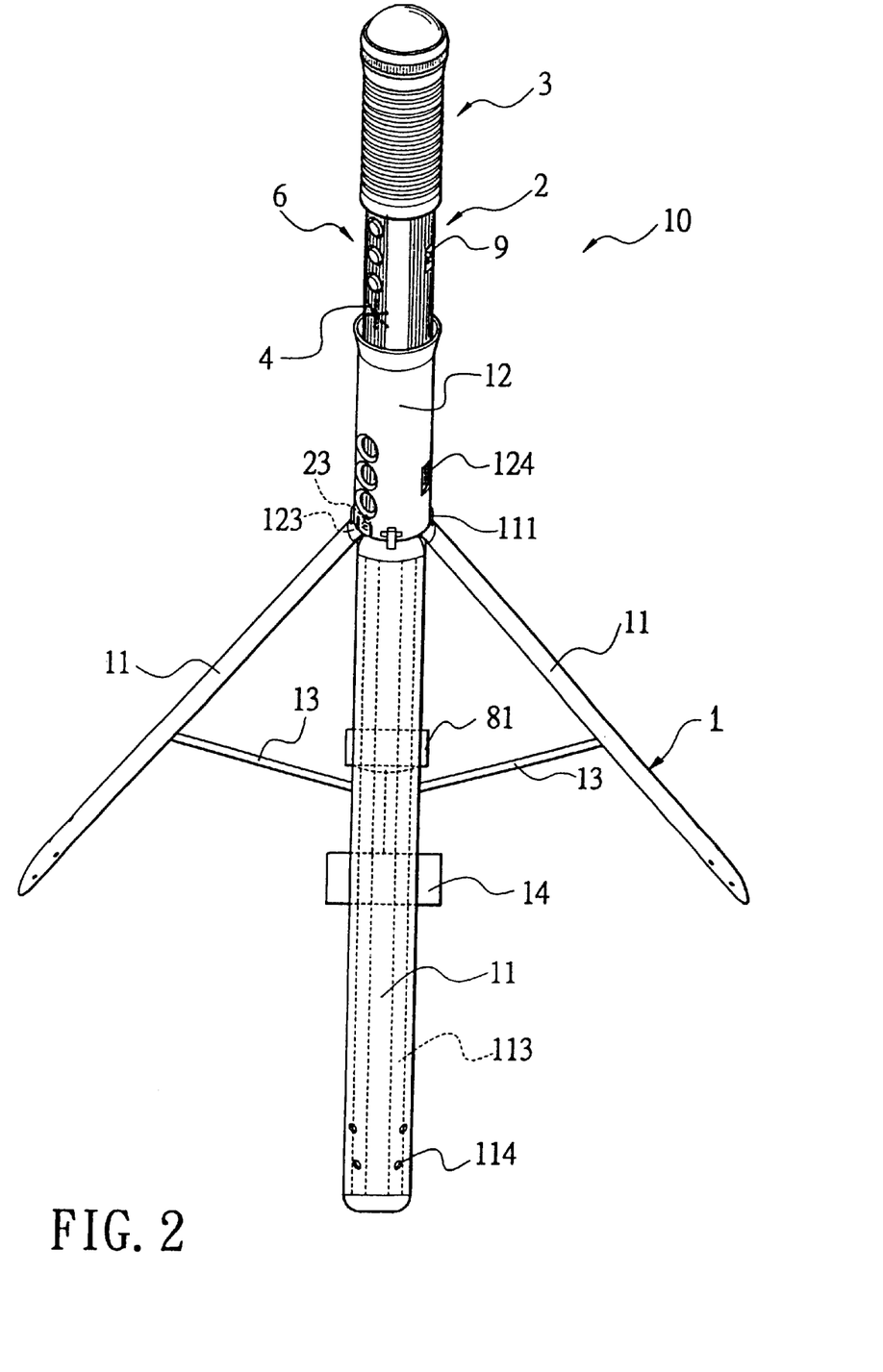
FIG. 2 is similar to FIG. 1, where warning device is partly extended.
Figure 3:
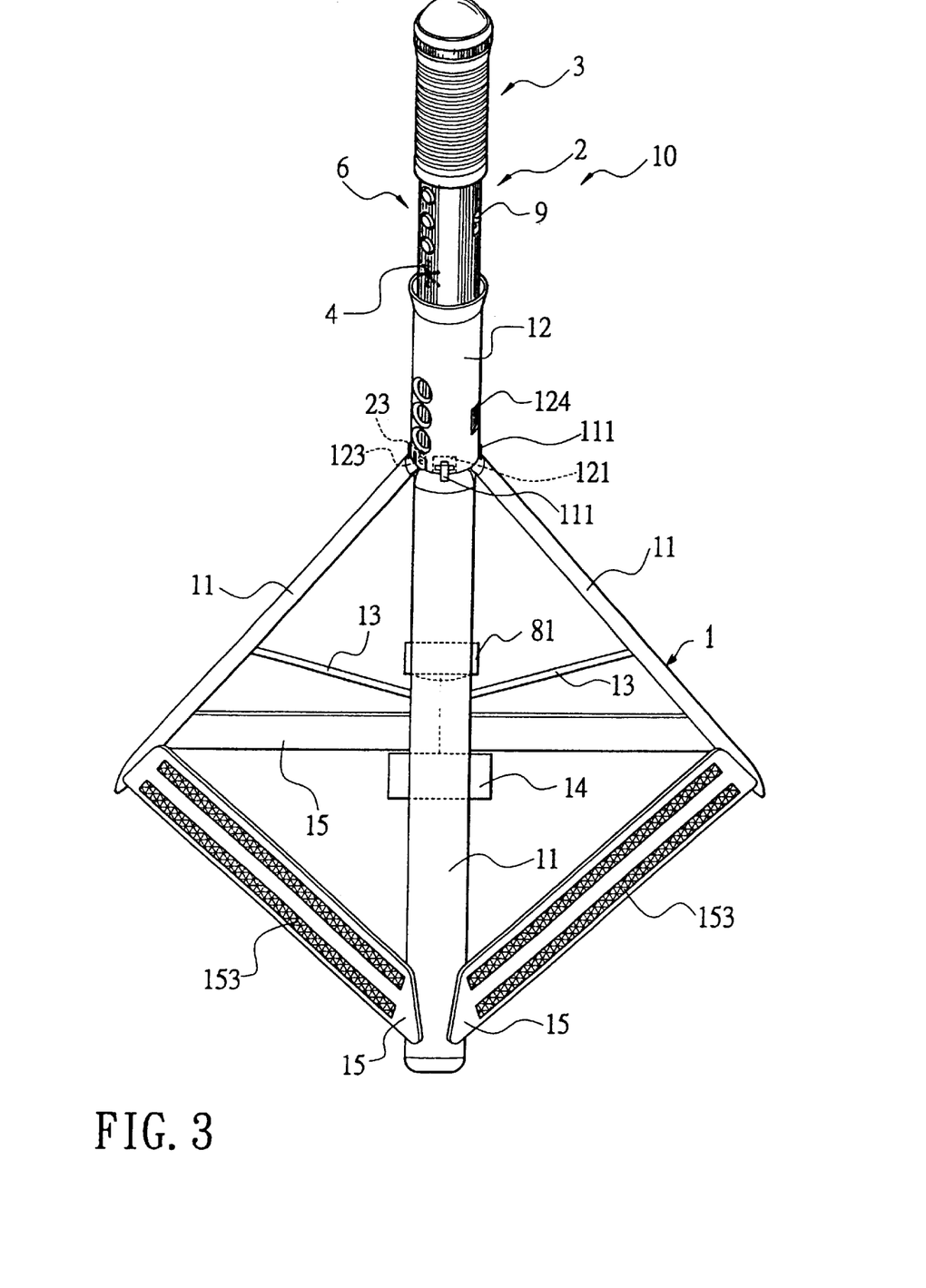
FIG. 3 is similar to FIG. 1, where warning device is fully extended.

Various configurations of the invention are illustrated below. The warning device 10 is stable when legs 11 are fully extended to form a tripod and boards 15 are installed thereon (FIG. 3). The warning device 10 is also stable when board 15 are detached from the configuration shown in FIG. 3 (see FIG. 2). The warning device 10 is collapsed as a hand held club (FIG. 1).

Figure 4:
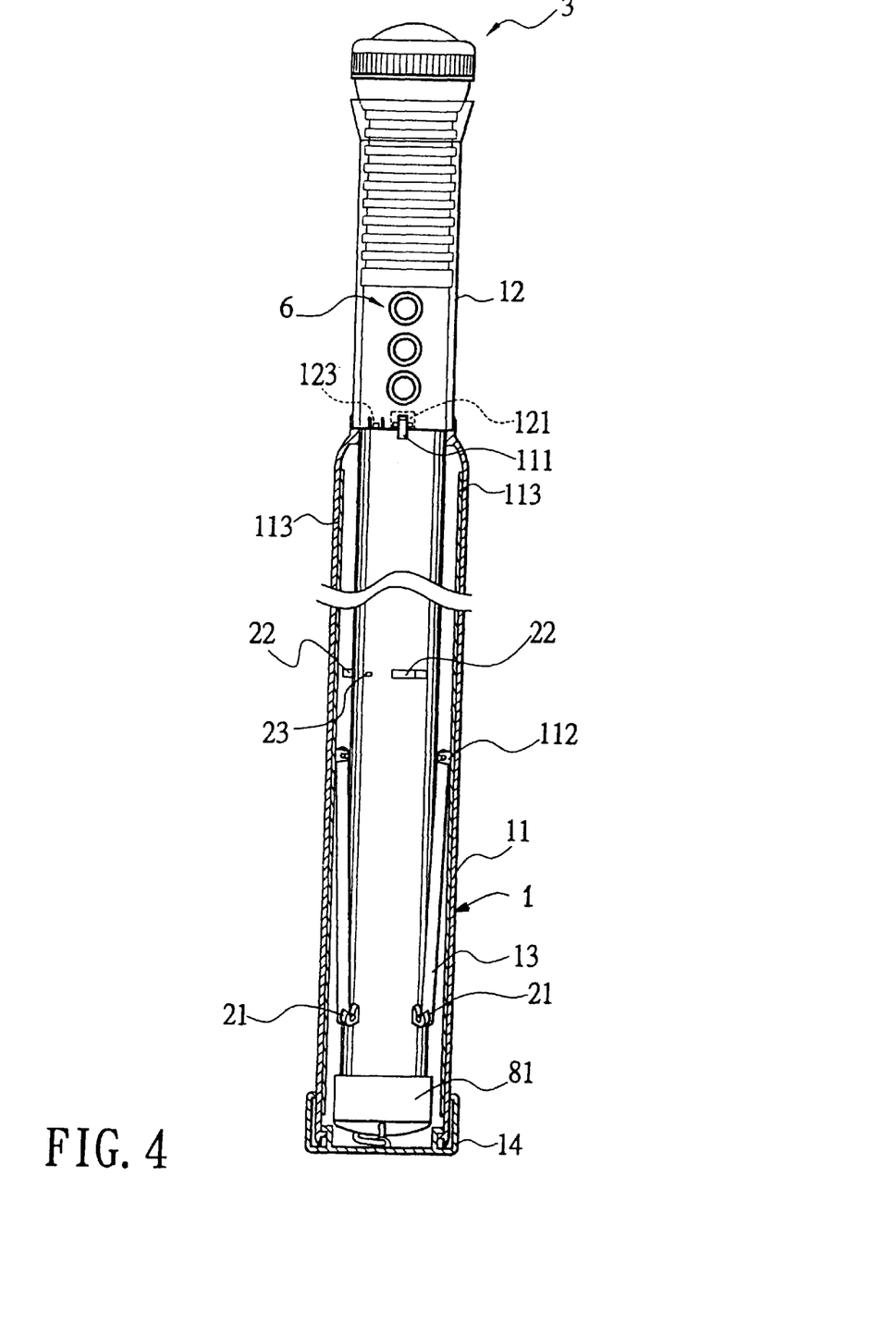
FIG. 4 is side partly sectional view of FIG. 1.
Figure 5:
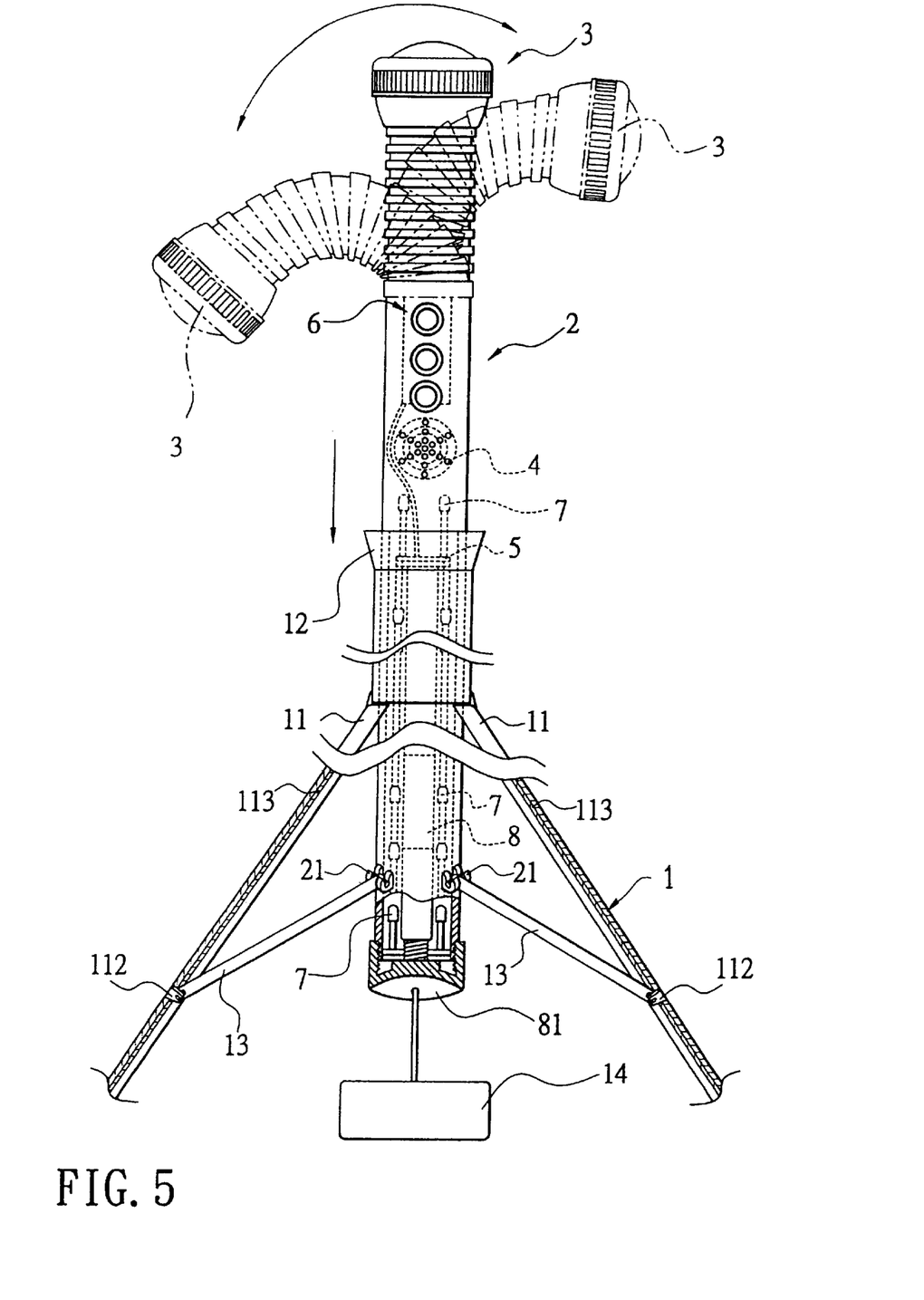
FIG. 5 is similar to FIG. 4, where warning device is fully extended.
Figure 6:
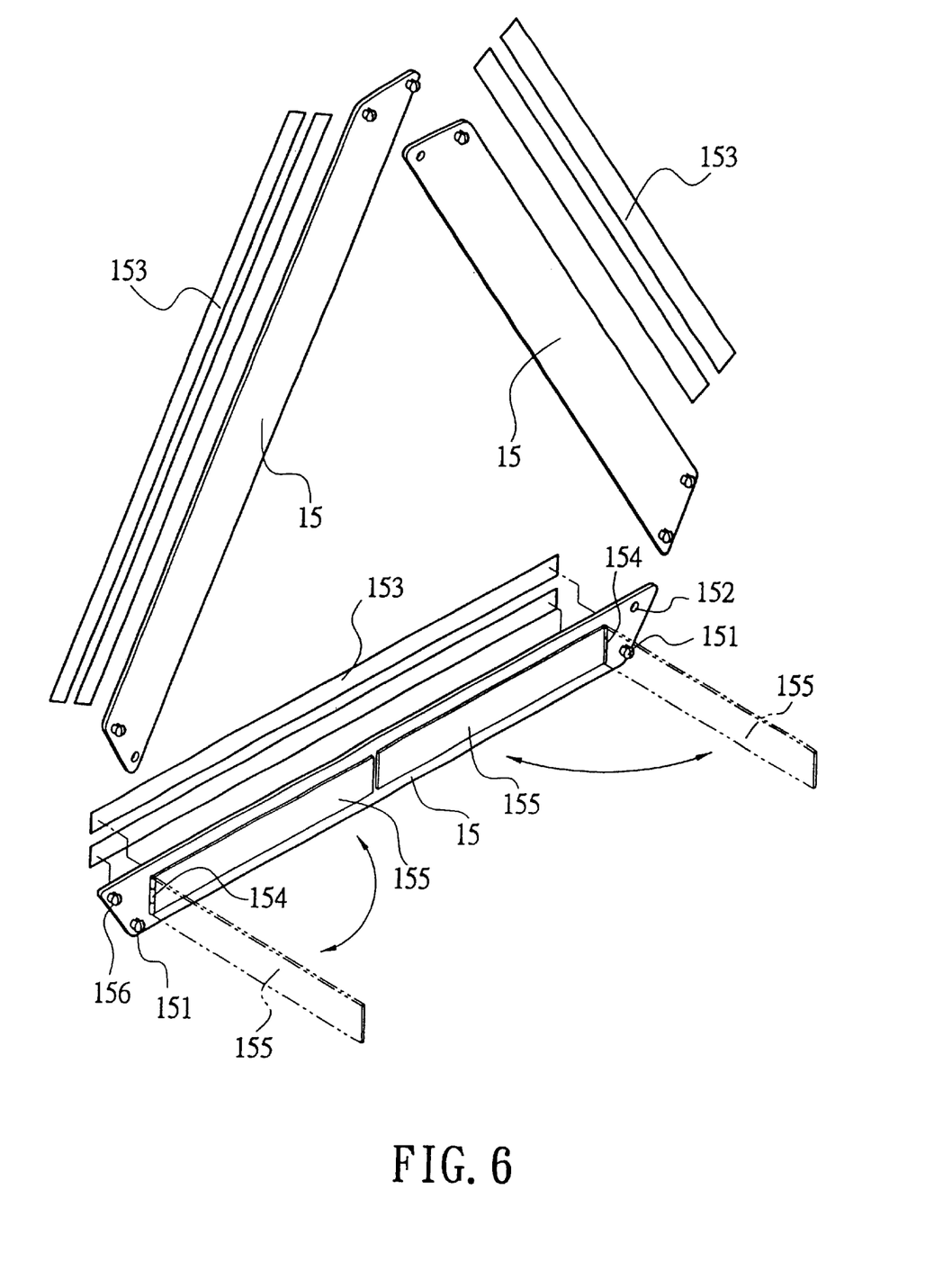
FIG. 6 is an exploded view of boards.
Figure 7:
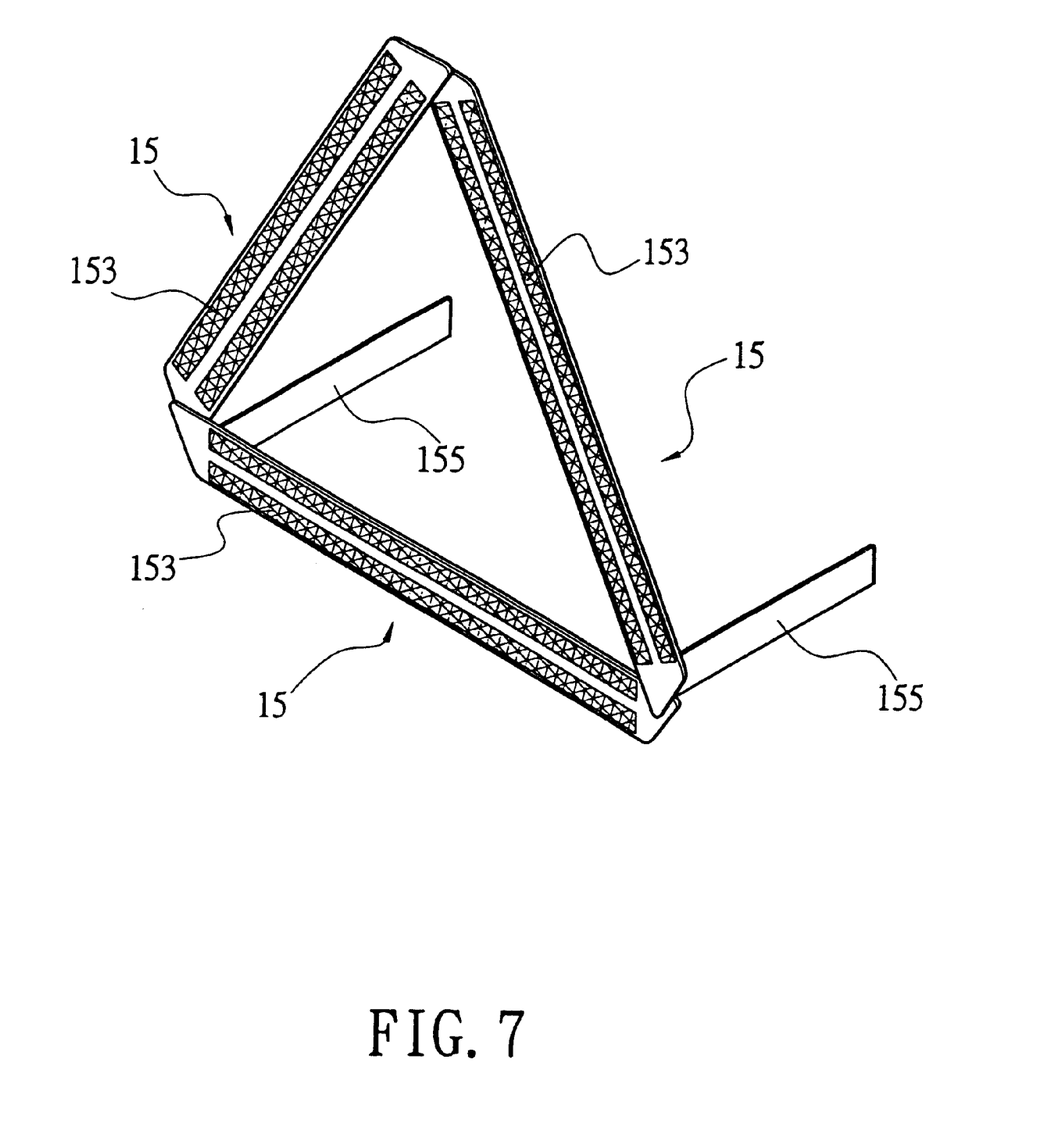
FIG. 7 is a perspective view of assembled boards of FIG. 6.

The button set 6 has three buttons wherein top button is for controlling the flexible lamp 3 (FIG. 4). Cover 14 may receive the collapsed warning device 10 at the bottom (FIG. 5). Moreover, center button is for controlling the flashing of strip or LED lamps 7.

Figure 8:
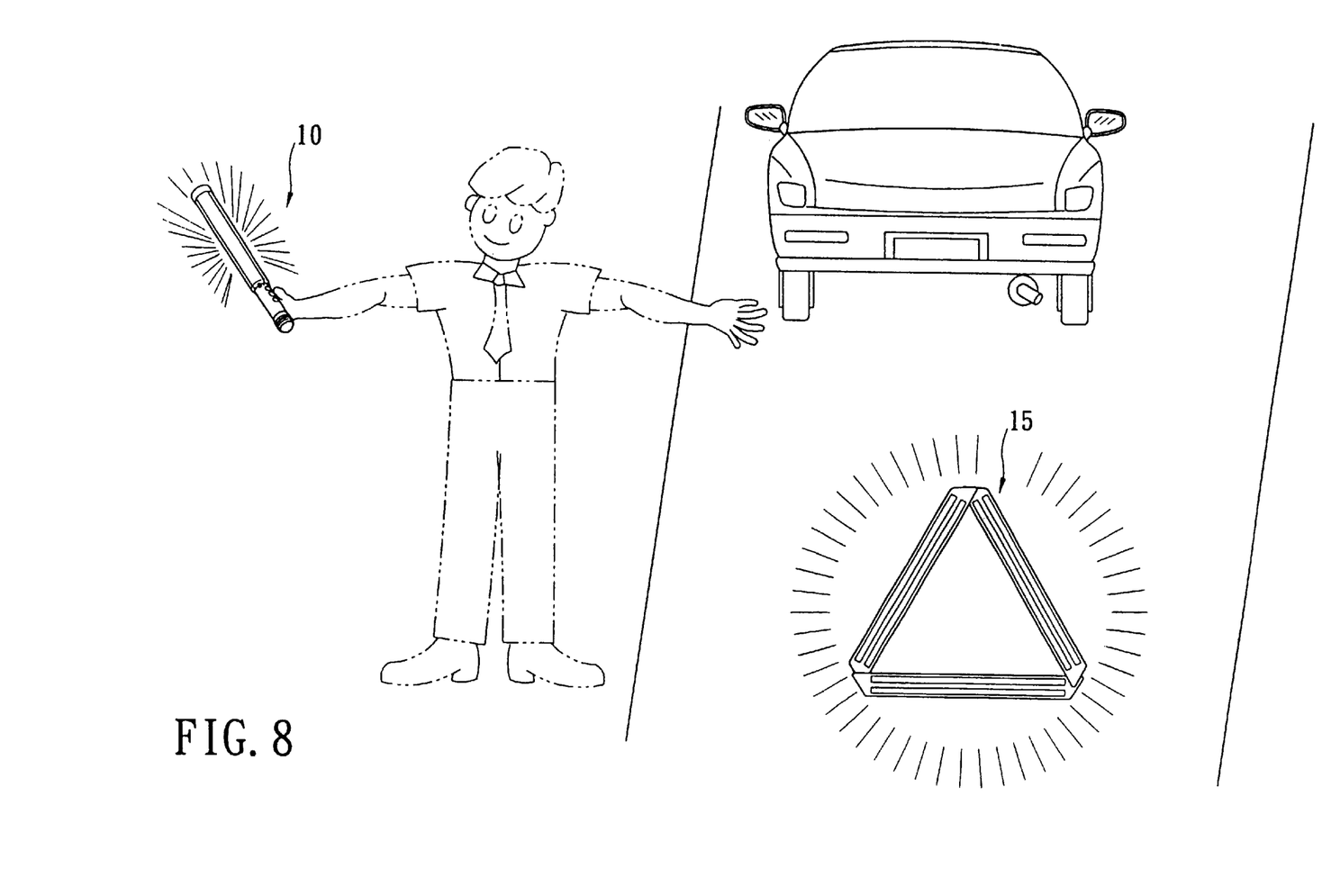
FIG. 8 is an environmental view illustrating the warning device of the invention used as a club for regulating traffic.
Figure 9:
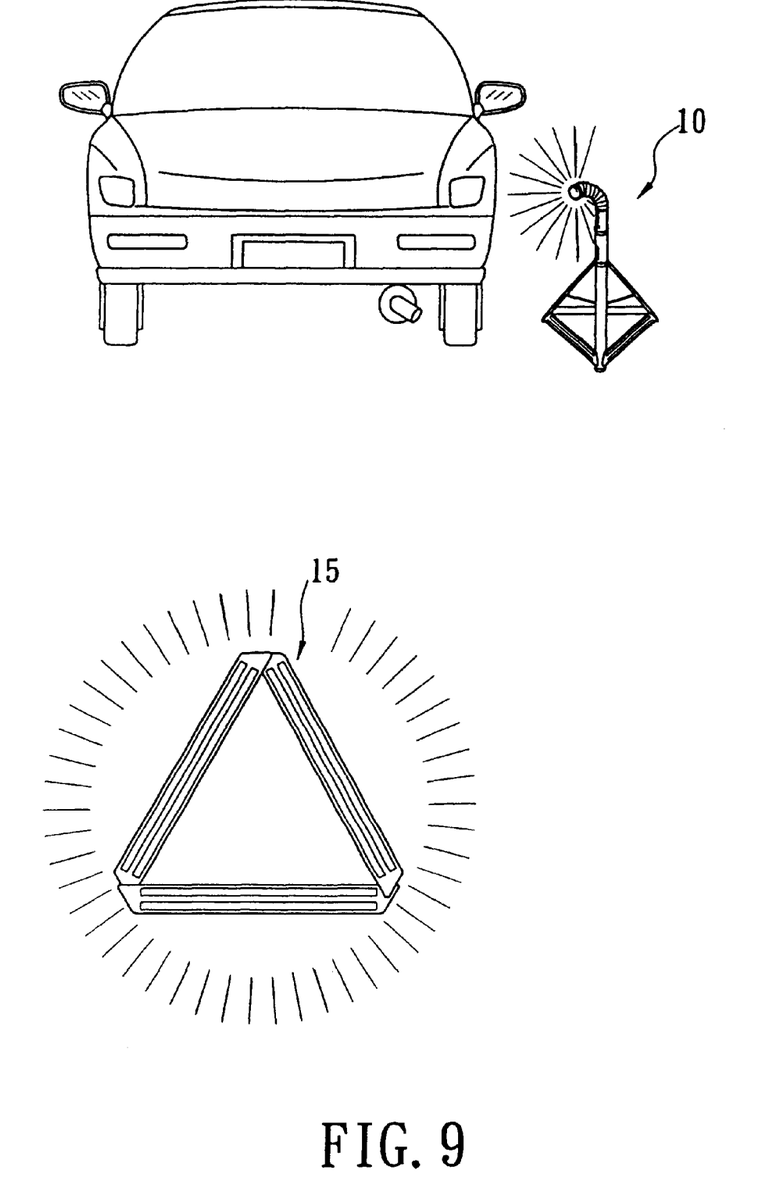
FIG. 9 is another environmental view illustrating the warning device of the invention used as a sign for alerting passing vehicles.

Referring to FIGS. 8 and 9 specifically, the warning device 10 is used as a club for regulating traffic. This is particularly applicable to a situation such as breakdown of car in a dark environment such as night (FIG. 8). Also the warning device 10 and boards 15 (in a position at a suitable distance behind the car) both are used as a sign for alerting passing vehicles (FIG. 9). Additionally, the bottom button of button set 6 is for controlling the buzzer 4. This provides an additional security when a robbery occurs.

While the invention herein disclosed has been described by means of specific embodiments, numerous modifications and variations could be made thereto by those skilled in the art without departing from the scope and spirit of the invention set forth in the claims.

What is claimed is:

1. A warning device comprising a telescoping stand, a body, a flexible main lamp, a buzzer, a circuitry, a button set, a charging outlet, a battery compartment with a cap, a link, a cover, and three boards wherein the telescoping stand is a cylindrical shaped member with the main lamp mounted on top, the button set and the charging outlet opposed to the button set are on the upper portion, the buzzer and the circuitry are below the button set on the upper portion, a number of LED lamps are attached together on the side, and the battery compartment and battery cap are on the lower portion;

the telescoping stand has three legs each with an arcuate section and a sleeve slidable to a position below the top of the main lamp, each of the legs has a plurality of luminescent stripes adhered on the inner surface thereon, each of the legs has a top catch member with a pin hinged to a pivot of the sleeve at a circumferential surface near the bottom thereof, the link is pivotably secured between a lower catch member at the center of each of the legs and a catch member of the body, the sleeve has an aperture and a plurality of projections being secured to a plurality of mating recesses on the surface of the body, the projections on the inner surface of the sleeve are received in the mating recesses of the body, the legs are extended outwardly by the downward movement of the slidable sleeve when the cover on the bottom of the body is detached, and the projections and the mating recesses are engaged, whereby the legs form a tripod; and each of the boards has a first protrusion on either side capable of snapping into each of the legs so as to form a tripod.

2. The warning device of claim 1, wherein the aperture of the sleeve is corresponding to the charging outlet.

3. The warning device of claim 1, further comprising a pair of opposing hinged plates provided on one of the boards, and each of the boards has a hole on one end and a second protrusion on the opposing end such that the second protrusion of each of the boards is inserted into the hole of the adjacent board to form a triangle wherein the plates may extend to form a U with the attached board to serve as a support of the triangle.

* * * * *